United States Patent
Sahasi (10) Patent No.: US 9,720,577 B1
(45) Date of Patent: Aug. 1, 2017

(54) WEBCAST AND VIRTUAL ENVIRONMENT CONTENT RECOMMENDATION ENGINE AND METHOD FOR RECOMMENDATION USING USER HISTORY AND AFFINITY WITH OTHER INDIVIDUALS TO PREDICT INTERESTING CURRENT FUTURE WEBCASTS AND ONLINE VIRTUAL ENVIRONMENTS AND CONTENT

(71) Applicant: ON24, Inc., San Francisco, CA (US)

(72) Inventor: Jayesh Sahasi, Los Altos, CA (US)

(73) Assignee: ON24, Inc., San Francisco, CA (US)

( * ) Notice: Subject to any disclaimer, the term of this patent is extended or adjusted under 35 U.S.C. 154(b) by 274 days.

(21) Appl. No.: 14/267,667

(22) Filed: May 1, 2014

(51) Int. Cl.
*G06F 3/0484* (2013.01)

(52) U.S. Cl.
CPC .................. *G06F 3/0484* (2013.01)

(58) Field of Classification Search
CPC .................................................... G06F 3/0484
USPC ......................................................... 715/730
See application file for complete search history.

(56) References Cited

U.S. PATENT DOCUMENTS

2014/0279049 A1* 9/2014 Wiseman ............... H04L 51/32
705/14.66
2015/0304367 A1* 10/2015 Chan .................... H04L 65/403
709/204

* cited by examiner

*Primary Examiner* — Andrea Leggett
(74) *Attorney, Agent, or Firm* — DLA Piper LLP (US)

(57) ABSTRACT

A webcast and virtual environment content recommendation engine and method provide webcast and/or virtual environment content recommendation using user history and affinity with other individuals to predict interesting current future webcasts and online virtual environments and content.

21 Claims, 5 Drawing Sheets

WEBCAST AND VIRTUAL ENVIRONMENT CONTENT RECOMMENDATION ENGINE AND METHOD FOR RECOMMENDATION USING USER HISTORY AND AFFINITY WITH OTHER INDIVIDUALS TO PREDICT INTERESTING CURRENT FUTURE WEBCASTS AND ONLINE VIRTUAL ENVIRONMENTS AND CONTENT

FIELD

The disclosure relates to a field of webcasting and online Virtual Environments.

BACKGROUND

Today, it is very difficult to get a particular business user to attend a webcast or online Virtual Environments. As a result, a whole industry has sprung up around "audience generation"—geared to invite people to attend webcasts or online Virtual Environments via mass email campaigns, banner advertising, and use of mailing lists. This solution attempts to entice attendees who are already visiting a webcast or online virtual event to attend other webcasts or online virtual events by presenting targeted and relevant online webcast or Virtual Environments, thereby increasing attendance at additional events without relying on external audience generation tactics. Attendees also benefit from having targeted and interesting information presented, rather than vague and uninteresting content being delivered via mass-marketing strategies.

The above "audience generation" profiles attendees based on the webcast (or virtual online event) that they use is currently attending. For example, if a user attends a webcast where the speaker is talking about Cisco Routers, the user (and all other attendees) may be presented with a list of other "related" webcasts pitching the latest advances in Cisco Switches, or other Cisco Networking equipment. The limitation with these approaches is that they fail to see the entire history of the individuals' interactions when proposing related content—and makes overly broad assumptions and generalizations of the entire audience. Thus, it is desirable to provide a better method and system for recommending webcasts or online virtual environments and it is to this end that the disclosure is directed.

DETAILED DESCRIPTION OF ONE OR MORE EMBODIMENTS

The disclosure is particularly applicable to a web casting system that incorporates a recommendation system and it is in this context that the disclosure will be described. It will be appreciated, however, that the system and method has greater utility since the recommendation system may be incorporated into other systems, may be a separate system that interfaces with third party web casting or online virtual environment systems and may be implemented in other manners than those described below, all of which are within the scope of the disclosure.

The recommendation system and method may utilize both historical interest of the current attendee in a presentation and the selections made by others they share interests in common with to yield the most interesting and promising results in the domain of online webcasts and virtual environments.

Figure 1:
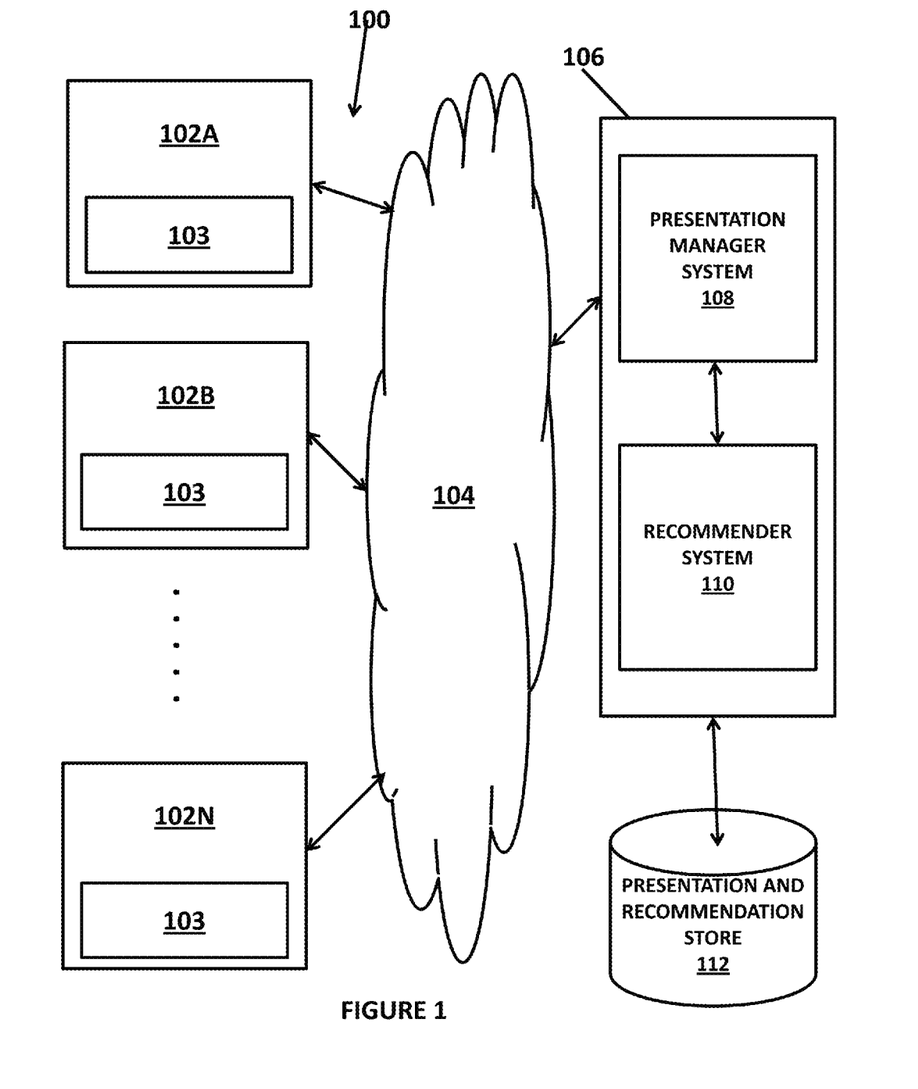
FIG. 1 illustrates an implementation of a presentation system that incorporates a recommendation system.

FIG. 1 illustrates an implementation of a presentation system 100 that incorporates a recommendation system 110. The presentation system may include one or more computing devices 102, such as 102A, 102B, . . . , 102N shown in FIG. 1, that are each used by a user to view and/or interact with a presentation delivered by the presentation system. The presentation may be a webcast, an online virtual environment an RSS feed or other types of presentations that may be viewed by heard by the user. Each computing device may have a processor, memory, a display and connectivity circuits (wireless or wired) that allow each computing device to connect to and interact with the presentation system. For example, each computing device may be a smartphone device, such as an Apple product, an Android OS product and the like, a personal computer, a terminal, a tablet computer or a laptop computer. In order to interact with the presentation system, each computing device may have an application 103, wherein the application may be a typical browser application stored in the memory of the computing device and executed by the processor of the computing device or may be an application resident on the computing device that is stored in the memory of the computing device and executed by the processor of the computing device.

Each computing device 102 may connect to/over a network 104 to a presentation backend 106. The network 104 may be a wireless or wired network. For example, the network 104 may be Ethernet, a wireless data network, a wireless cellular data network and/or a combination of one or more of the preceding networks that allow each computing device 102 to connect to and interact with the presentation backend 106.

The presentation backend 106 (and its components, a presentation manager system 108 and a recommender system 110) may be implemented in software or in hardware. In a software implementation, the presentation backend 106 may use one or more computing resources on which a plurality of lines of computer code are stored and executed by a processor of the computing resources to implement the presentation backend 106 and its components. The one or more computing resources may be one or more server computers or one or more cloud computing resources in which the one or more computing resources include at least one processor to execute the plurality of lines of computer code, at least one memory to store the plurality of lines of computer code and the like. In a hardware implementation of the presentation backend 106, the presentation backend 106 may be one or more hardware devices that implement the presentation backend 106 and its components. For example, the hardware devices may be one or more microcontrollers, one or more state machines, one or more programmable logic devices and the like. Other implementations of the presentation system provided by On24, Inc. (who is the assignee of the present application) may be found in U.S. patent application Ser. No. 11/292,483 filed on Dec. 2, 2005, Ser. No. 11/292,513 filed on Dec. 2, 2005 and Ser. No. 12/755,849 filed on Apr. 7, 2010, the entirety of which are incorporated herein by reference.

The presentation backend 106 may further include a presentation manager system 108 that may manage the presentations and manage the computing devices of each audience member that is going to view a particular presentation. Further details of the presentation manager system 108 are described in co-pending U.S. patent application Ser. No. 11/292,483 filed on Dec. 2, 2005, Ser. No. 11/292,513 filed on Dec. 2, 2005 and Ser. No. 12/755,849 filed on Apr. 7, 2010, the entirety of which are incorporated herein by reference. The presentation backend 106 may further include a recommender system 110 that may provide personalized presentation recommendations to each audience member based on historical interest of the current attendee in a presentation and the selections made by others they share interests in common with the audience member as described in more detail below. The presentation system may also have a store 112 that may store various data used by the system, such as a plurality of presentations to be delivered to audience members and recommendations generated by the recommender system 110. As described above, the recommendation system 110 may be part of the presentation system 100 as shown in FIG. 1, but the recommender system 110 may also be incorporated into other systems that generate and deliver content to one or more users or may be a separate system that interfaces with third party web casting or online virtual environment systems and delivers the personalized recommendations to the third party presentation systems.

Figure 2:
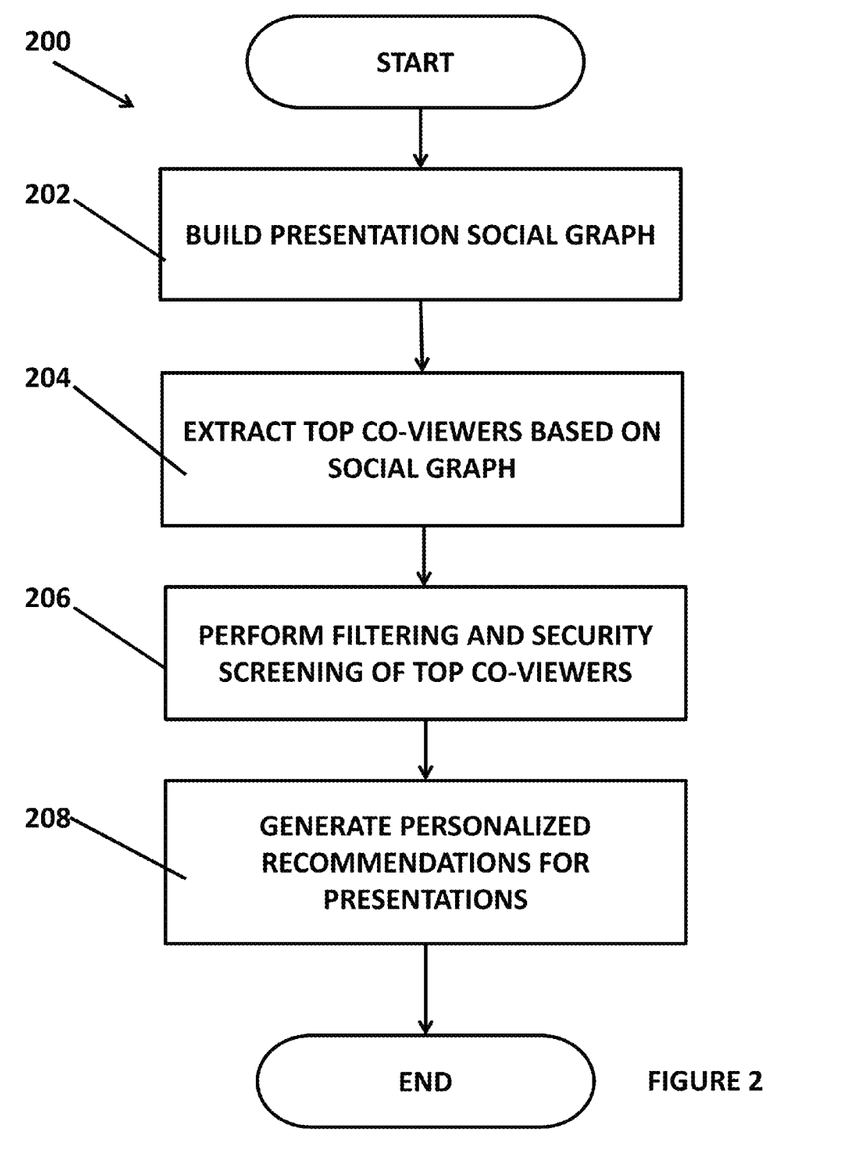
FIGS. 2-3 illustrate a method for presentation recommendation.
Figure 3:
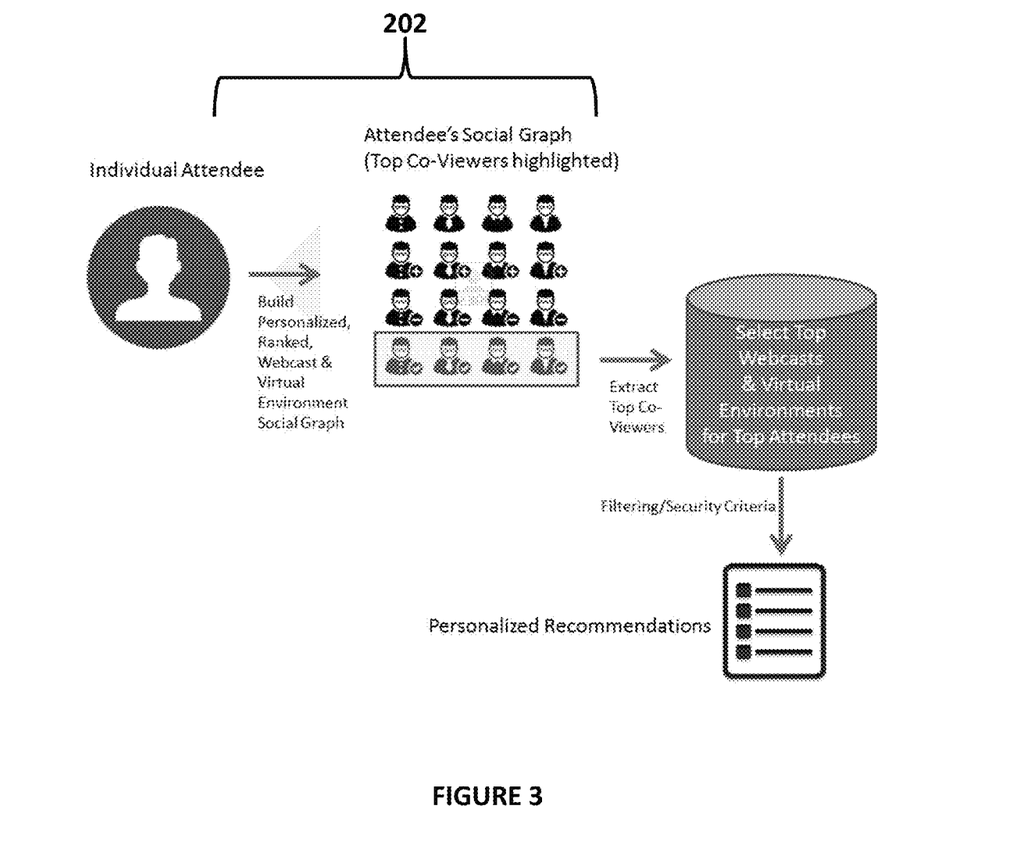

FIGS. 2-3 illustrate a method for presentation recommendation 200 that may be, for example, implemented using the recommender system shown in FIG. 1. Each presentation, that may be a webcast or an online virtual environment, may have registered attendees/audience members, who typically provide at least their email address when registering to attend the presentations, that may be, for example, free online events. In the recommendation method, the recommender system may create a social graph of each attendee of a presentation (202.) The social graph may show the other one or more audience members/attendees who are viewing the presentation being viewed by the attendee, how long each of the attendees watched the webcast or attended the online virtual environment, and/or what specific interactions took place between the attendees. In the method, the attendance duration and the attendee interactions with the presentation may be weighted and scored and may factor into the matching process to determine the "top" co-viewers or attendees for a presentation that is also attended by/interacted with by a particular user (204.) An important part of this process of determining the "top" co-viewers includes how many webcasts or virtual environments the current attendee has in common with all other webcasts and virtual environments. It is important to note that the top co-viewers/attendees can easily be different for Attendee A vs Attendee B, both of whom are viewing a particular webcast.

Once the top co-viewers/attendees are identified based on the scoring process identified above, the method may further filter that list (206) based on which online webcasts or virtual environments have provided access to be referred in this manner, as well as how many such webcasts or virtual environments need to be presented by this recommendation engine. Once the filtering is completed, the result may be presented (208) to the current attendee as a personalized list of recommendations, presented in a plurality of display formats, online locations, and devices. The scoring process and recommendation is now described in more detail below with reference to FIG. 4.

Figure 4:
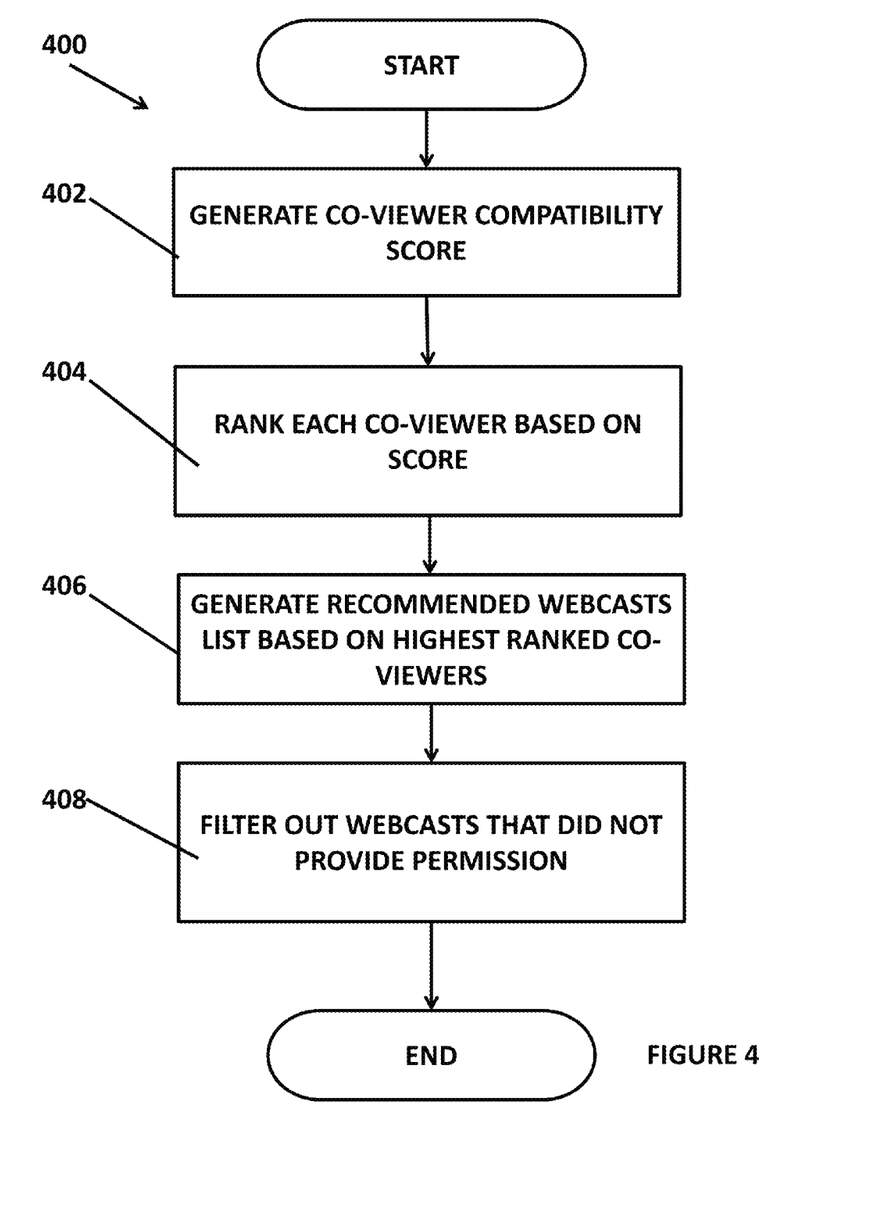
FIG. 4 illustrates more details of the presentation recommendation.

FIG. 4 illustrates more details of a method 400 for presentation recommendation that may be, for example, implemented using the recommender system shown in FIG. 1. In the examples in FIG. 4, the presentation may be a webcast, but it is understood that the presentation may also be an online virtual environment or other types of presentations. In the method, for a viewer "A" attending webcast 1, look at all co-viewers (others attending the same webcast) and generate a co-viewer compatibility score (402). In particular, for each co-viewer, the process may determine how many other webcasts that co-viewed has attended that viewer "A" has also attended and use that data to generate the co-viewer compatibility score based on a configurable set of weights assigned to each of the following one or more pieces of data: a) a number of webcasts/presentations in common (e.g., 5 points assigned for each common webcast); b) a duration of viewing for each webcasts (e.g., 1 point for the full webcast, a proportional fraction for viewing less that the full presentation); c) documents downloaded in common with viewer "A" (e.g., 1 point for each document in common downloaded during the presentation); d) poll or Survey responses matching viewer A's responses (e.g., 1 point for each matching poll or survey response); and/or e) specific demographic registration fields (e.g., Age, Title, Industry, Company) that match those of viewer "A" (e.g., 0.5 point assigned per matched field). Thus, for each co-viewer, a total score based on the above data is determined that shows the compatibility of viewer "A" and the particular co-viewer.

The method may then rank each co-viewer, in descending order, based on the Co-Viewer Compatibility Score for each co-viewer (404.) The method may then perform a filter process as described above and now described in more detail. During the filtering process, the recommender system may generate a list of recommended presentations/webcasts based on a number of highest ranking co-viewers (406). Specifically, the recommender system may take a predetermined number of the top scoring co-viewers, such as for example 10, and determine the other webcasts they have attended (or have registered for, in case of upcoming webcasts) and those other webcasts/presentations may be the recommended webcasts list. The method may also filter out webcasts/presentations (408) that have not given permission to be listed as "recommended webcasts" to arrive at the recommended webcasts/presentations list for viewer "A". In the method, if the list of recommended webcasts/presentations is not long enough, such as greater than 20-30 presentations/webcasts, the method may increase the number of highest ranking co-viewers (by using additional co-viewers who may have lower rankings, for example) and may then re-generate the recommended list as described above.

Figure 5:
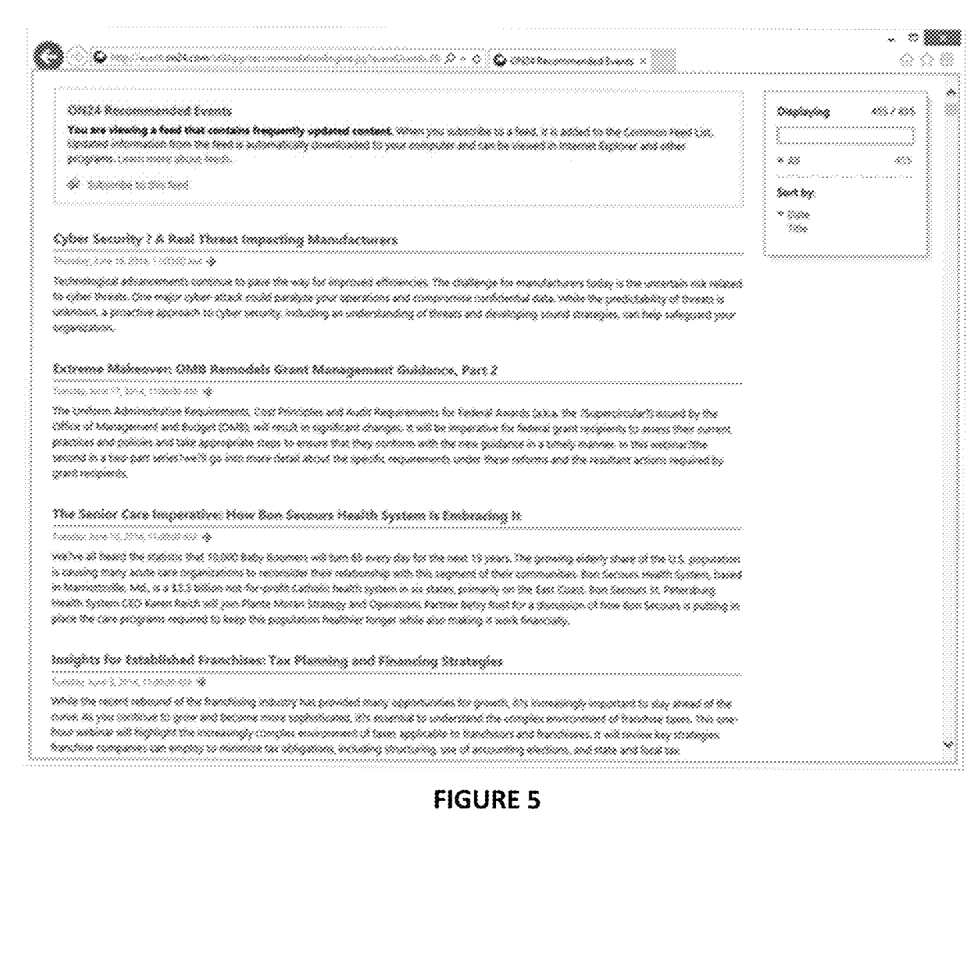
FIG. 5 illustrates an example of an RSS feed recommendation provided by the recommendation system.

FIG. 5 illustrates an example of an RSS feed recommendation provided by the recommendation system. In this example, 455 RSS feeds (another type of presentation) are in a list of recommended presentations based on the methodology described above. In the example in FIG. 5, four recommended presentations are shown to the user who can then scroll through the other recommended presentations.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A method for recommending an online presentation, comprising:
   generating a list of one or more co-viewers that have interacted with a presentation being interacted with by a user;
   selecting a predetermined number of top co-viewers from the one or more co-viewers, the top co-viewers selected based on a length of time that the co-viewer interacted with the presentation and an interaction of the co-viewer with the presentation;
   determining each of the presentations interacted with by the predetermined number of selected top co-viewers; and
   recommending, for the user, the presentations interacted with by the predetermined number of top co-viewers.

2. The method of claim 1, wherein selecting the predetermined number of the one or more top co-viewers further comprises ranking the one or more top co-viewers based on a co-viewer compatibility score and selecting a predetermined number of the top co-viewers based on the ranking.

3. The method of claim 2, wherein selecting a predetermined number of the co-viewers based on the ranking further comprises selecting a predetermined number of the top co-viewers based on a higher ranking of the co-viewer.

4. The method of claim 2, wherein generating the co-viewer compatibility score for each co-viewer further comprises combining one or more of a presentation in common score, a duration score, a documents score, a poll score and a demographics information score.

5. The method of claim 4, wherein combining the one or more scores further comprises generating the presentation in common score that a score based on a number of presentation in common between the co-viewer and the user, generating the duration score that is a duration of viewing time for each presentation interacted with by the user and the co-viewer, generating the document score that is a score based on one more documents downloaded for each presentation interacted with by the user and the co-viewer, generating the poll score that is a score based on one or more poll and a survey response that match a response of the user and generating the demographics information score that is a scope based on demographic registration fields that match demographic registration fields of the user.

6. The method for claim 1, wherein generating the list of one or more co-viewers further comprises generating a presentation social graph from a plurality of presentation attendees including the user and one or more co-viewers and extracting one or more co-viewers from the presentation social graph wherein the extracted one or more co-viewers have interacted with the presentation being interacted with by the user.

7. The method of claim 1 further comprising filtering the one or more presentations to generate the recommended presentations.

8. The method of claim 1, wherein the presentation is one of a webcast, an RSS feed and an online virtual environment.

9. The method of claim 1 further comprising displaying a recommended presentation using a presentation system.

10. The method of claim 1, wherein selecting the predetermined number of the one or more top co-viewers further comprising generating a co-viewer compatibility score for each of the one or more co-viewers and selecting a predetermined numbers of co-viewers having a highest compatibility score.

11. A presentation system, comprising:
   a computer system having a processor;
   a presentation manager executed by the processor of the computer system, the processor configured to manage a presentation to one or more attendees;
   a recommender component executed by the processor of the computer system, coupled to the presentation manager, the processor configured to generate a list of one or more co-viewers that have interacted with a presentation being interacted with by a user, select a predetermined number of top co-viewers from the one or more co-viewers, the top co-viewers selected based on a length of time that the co-viewer interacted with the presentation and an interaction of the co-viewer with the presentation, determine each of the presentations interacted with by the predetermined number of selected top co-viewers and recommend, for the user, the presentations interacted with by the predetermined number of selected top co-viewers.

12. The system of claim 11, wherein the recommender component is further configured to rank the one or more top co-viewers based on a co-viewer compatibility score and select a predetermined number of the top co-viewers based on the ranking.

13. The system of claim 12, wherein the recommender component is further configured to select the predetermined number of the top co-viewers based on a higher ranking of the co-viewer.

14. The system of claim 12, wherein the recommender component is further configured to combine one or more of a presentation in common score, a duration score, a documents score, a poll score and a demographics information score to generate the co-viewer compatibility score.

15. The system of claim 14, wherein recommender component is further configured to generate the presentation in common score that a score based on a number of presentation in common between the co-viewer and the user, generate the duration score that is a duration of viewing time for each presentation interacted with by the user and the co-viewer, generate the document score that is a score based on one more documents downloaded for each presentation interacted with by the user and the co-viewer, generate the poll score that is a score based on one or more poll and a survey response that match a response of the user and generate the demographics information score that is a scope based on demographic registration fields that match demographic registration fields of the user.

16. The system for claim 11, wherein the recommender component is further configured to generate a presentation social graph from a plurality of presentation attendees including the user and one or more co-viewers and extract one or more co-viewers from the presentation social graph wherein the extracted one or more co-viewers have interacted with the presentation being interacted with by the user.

17. The system of claim 11, wherein the recommender component is further configured to filter the one or more presentations to generate the recommended presentations.

18. The system of claim 11, wherein the presentation is one of a webcast, an RSS feed and an online virtual environment.

19. The system of claim 11, wherein the presentation system displays a recommended presentation using a presentation system.

20. The system of claim 11 further comprising one or more computing devices that display the presentation.

21. The system of claim 11, wherein the processor configured to select a predetermined number of the one or more top co-viewers further is configured to generate a co-viewer compatibility score for each of the one or more co-viewers and select a predetermined numbers of co-viewers having a highest compatibility score.

* * * * *